(12) United States Patent
Samprathi et al.

(10) Patent No.: US 8,045,474 B2
(45) Date of Patent: Oct. 25, 2011

(54) METHOD AND APPARATUS FOR TRACKING LAYER-2 (L2) RESOURCE OF A SWITCH

(75) Inventors: Ravikanth Samprathi, Mountain View, CA (US); Dar-Hsin Dustin Wu, Fremont, CA (US); Suran De Silva, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 827 days.

(21) Appl. No.: 11/043,551

(22) Filed: Jan. 26, 2005

(65) Prior Publication Data

US 2006/0165095 A1 Jul. 27, 2006

(51) Int. Cl.
*G01R 31/08* (2006.01)
*H04L 12/28* (2006.01)
*H04L 12/66* (2006.01)
*H04L 12/40* (2006.01)
*H04J 3/16* (2006.01)

(52) U.S. Cl. ........ 370/241; 370/351; 370/352; 370/401; 370/465

(58) Field of Classification Search .......... 370/401, 370/351, 352, 241, 465
See application file for complete search history.

(56) References Cited

U.S. PATENT DOCUMENTS

| 5,880,742 | A  | * | 3/1999  | Rao et al. ...................... 345/440 |
| 6,598,034 | B1 | * | 7/2003  | Kloth ............................... 706/47 |
| 6,633,835 | B1 | * | 10/2003 | Moran et al. ................... 702/190 |
| 2003/0053450 | A1 | * | 3/2003  | Kubota et al. ................. 370/356 |
| 2004/0252837 | A1 | * | 12/2004 | Harvey et al. ................. 380/270 |
| 2005/0171731 | A1 | * | 8/2005  | Chen et al. .................... 702/176 |

OTHER PUBLICATIONS

Internet web page download from http://www.firerack.com/features/FMS/mac-tracking entitled "MAC Address Tracking".

* cited by examiner

*Primary Examiner* — Daniel J Ryman
*Assistant Examiner* — John Blanton
(74) *Attorney, Agent, or Firm* — Fish & Richardson P.C.

(57) ABSTRACT

A method and apparatus for tracking at least one Layer-2 (L2) resource of a network device is provided. The method includes monitoring software operations on the L2 resource. The method further includes monitoring the state of the L2 resource in a corresponding hardware device (e.g., the network device). The L2 resource may be at least one of a Media Access Control (MAC) address, a Virtual Local Area Network (VLAN) identifier, a MAC address, and a VLAN identifier pair.

18 Claims, 4 Drawing Sheets

METHOD AND APPARATUS FOR TRACKING LAYER-2 (L2) RESOURCE OF A SWITCH

BACKGROUND OF THE INVENTION

1. Field of Invention

Embodiments of this invention relate in general to layer-2 (L2) resources of network devices. More specifically, embodiments of this invention relate to methods and systems for tracking L2 resources of network devices.

2. Description of the Background Art

In computer networks, data is transferred through a series of hardware and software levels or layers. These layers may be broadly classified into a network interface layer, an internetwork layer, a transport layer, and application layer. The network interface layer includes a physical layer and a data-link layer. The physical layer relates to the electrical and mechanical connections between the network devices. The data-link layer is layer-2 (L2) in an Open Systems Interconnect (OSI) model and controls the transfer of data across the physical layer in the computer network. The data-link layer (hereinafter referred to as the L2 layer) is further divided into a Logical Link Control (LLC) layer and a Media Access Control (MAC) layer. The MAC layer controls the access of network components to the data that is being transferred. In order to control the access of the network components, the MAC layer defines an L2 resource for each network device. The L2 resource can be defined by using a unique hardware/data-link/MAC address for each network device. The data is transferred within the computer network, based on the destination MAC address.

Network devices such as switches maintain a MAC-address-table in which the MAC address of each computer connected to the respective network devices is stored.

In conventional switches, the state of the MAC addresses in the MAC-address-table may be determined by using an Internetworking Operating System (IOS) Command Line Interface (CLI) entry such as a 'show MAC-address-table'. Further, the changes in the state of the MAC address are logged in conventional switches.

However, conventional switches do not monitor L2 features that direct a change in the state of the MAC address. The L2 features that may direct the change in the state of the MAC address may be, for example, distributed forwarding, distributed learning and MAC limiting. Further, conventional switches do not monitor other L2 resources such as a Virtual Local Area Network (VLAN) identifier.

SUMMARY OF EMBODIMENTS OF THE INVENTION

In one embodiment, the invention provides a method for tracking at least one Layer-2 (L2) resource of a network device. The method comprises: (i) monitoring software operations on the L2 resource, and (ii) monitoring the state of the L2 resource in the network device. The network device can be a switch such as a distributed network switch.

In another embodiment, the invention provides an apparatus for tracking at least one L2 resource of a network device. The apparatus comprises: (i) means for monitoring software operations on the L2 resource, and (ii) means for monitoring hardware device to monitor the state of the L2 resource in the network device.

In yet another embodiment, the invention provides an apparatus for tracking at least one L2 resource of a switch. The apparatus comprises: (i) a software-operations-monitoring module to monitor software operations on the L2 resource, and (ii) a hardware-monitoring module to monitor the state of the L2 resource in the switch. The software-operations-monitoring module comprises: (a) a storing module to store information pertaining to the user, and (b) a detecting module to detect an L2 feature, which directs the change in the state of the L2 resource.

Further embodiments of the invention provide an apparatus for tracking at least one L2 resource of a network device. The apparatus comprises: (i) a processing system, including a processor coupled to a display and user input device; and (ii) a machine-readable medium that includes instructions executable by the processor. The machine-readable medium comprises: (a) one or more instructions for monitoring software operations on the L2 resource, and (b) one or more instructions for monitoring the state of the L2 resource in the network device.

In another embodiment, the invention provides a machine-readable medium, which includes instructions executable by a processor, to track at least one L2 resource of a network device. The machine-readable medium comprises: (i) one or more instructions for monitoring software operations on the L2 resource; and (ii) one or more instructions for monitoring the state of the L2 resource in the network device.

These provisions, together with the various ancillary provisions and features that will become apparent to those skilled in the art, as the following description proceeds, are attained by devices, assemblies, systems, and methods of embodiments of the invention, the various embodiments thereof being shown with reference to the accompanying drawings, by way of example only, wherein:

DETAILED DESCRIPTION OF EMBODIMENTS OF THE INVENTION

The various embodiments of the invention provide a method and an apparatus for tracking at least one Layer-2 (L2) resource of a network device, such as a switch. A software-operations-monitoring means is provided for monitoring software operations on the L2 resource. Further, a hardware-monitoring means is provided for monitoring the state of the L2 resource in the network device (e.g. a corresponding hardware). Monitoring the state of the L2 resource and software operations allow tracking of the evolution, or changes to an L2 resource, including a MAC address, a VLAN, or a MAC address/VLAN pair associated with an L2 entry table. The tracking of the evolution or changes enables the identification of L2 features that direct the changes in the attributes within an L2 entry table.

Figure 1:
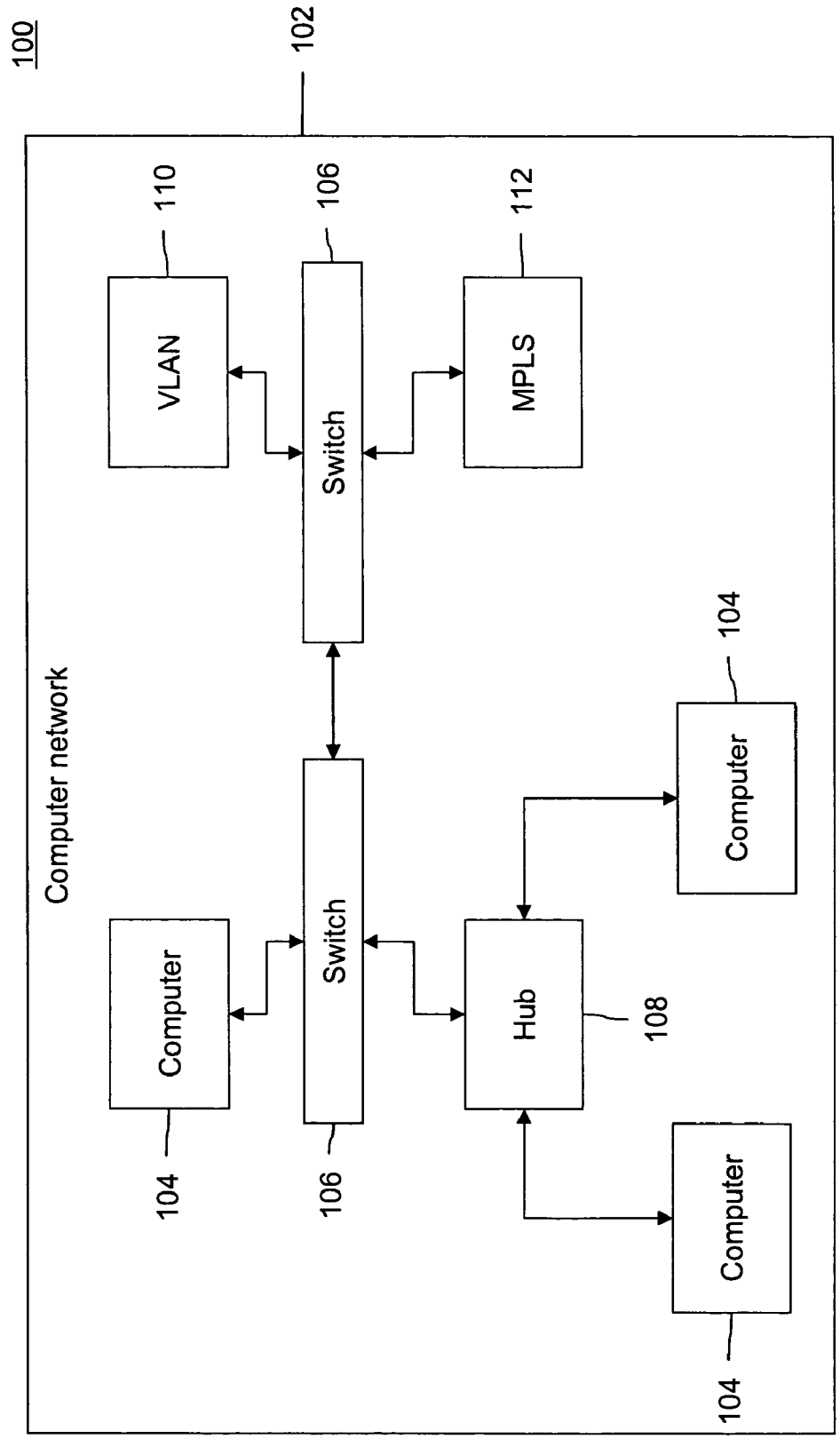
FIG. 1 depicts an environment wherein the invention can be practised, in accordance with various embodiments of the invention.

FIG. 1 depicts an environment 100 wherein the invention can be practised, in accordance with various embodiments of the invention. Environment 100 includes a computer network 102, which includes a plurality of computers 104 that are connected through a plurality of network devices. The network devices may be, for example, a switch 106, and the like. Computers 104 may also be connected to switch 106 through a hub 108. Further, computers 104 at different geographical locations may be connected to switch 106 through a Virtual Local Area Network (VLAN) 110, a Multi-protocol Label Switching (MPLS) 112, and other sub-networks.

In computer network 102, data is transferred through a series of hardware and software levels or layers. These layers may be broadly classified into a network interface layer, an inter-network layer, a transport layer, and an application layer. The network interface layer includes a physical layer and a data-link layer. The physical layer relates to the electrical and mechanical connections between the network devices. The data-link layer in an Open Systems Interconnect (OSI) model is the L2 layer and controls the transfer of data across the physical layer in computer network 102.

In order to control access of the network components, the data-link layer (hereinafter referred to as the L2 layer) defines various L2 resources. Exemplary L2 resources may be a Media Access Control (MAC) address, a VLAN identifier, a QinQ id, a MAC address/VLAN identifier pair, an MPLS tag, and a Virtual Circuit Identifier (VCID). The MAC address is a unique hardware/data-link/MAC address for each network component, for example, each computer 104, switch 106, hub 108, and other hardware components within computer network 102 has unique MAC addresses. The data is transferred within computer network 102, based on the destination MAC address. Similarly, the VLAN identifier is a VLAN 110 identification number. The QinQ id is an identifier that corresponds to a combination of Customer Edge Equipment (CE) VLAN and Provider Edge Equipment (PE) VLAN. Further, the MAC address/VLAN identifier pair corresponds to the MAC addresses of hardware components within VLAN 110. The MPLS tags generally refer to routing protocols used by MPLS 112. Similarly, the VCID is an identifier, used for routing and/or switching into a virtual circuit, i.e., a packet may be routed according to VCID.

Figure 2:
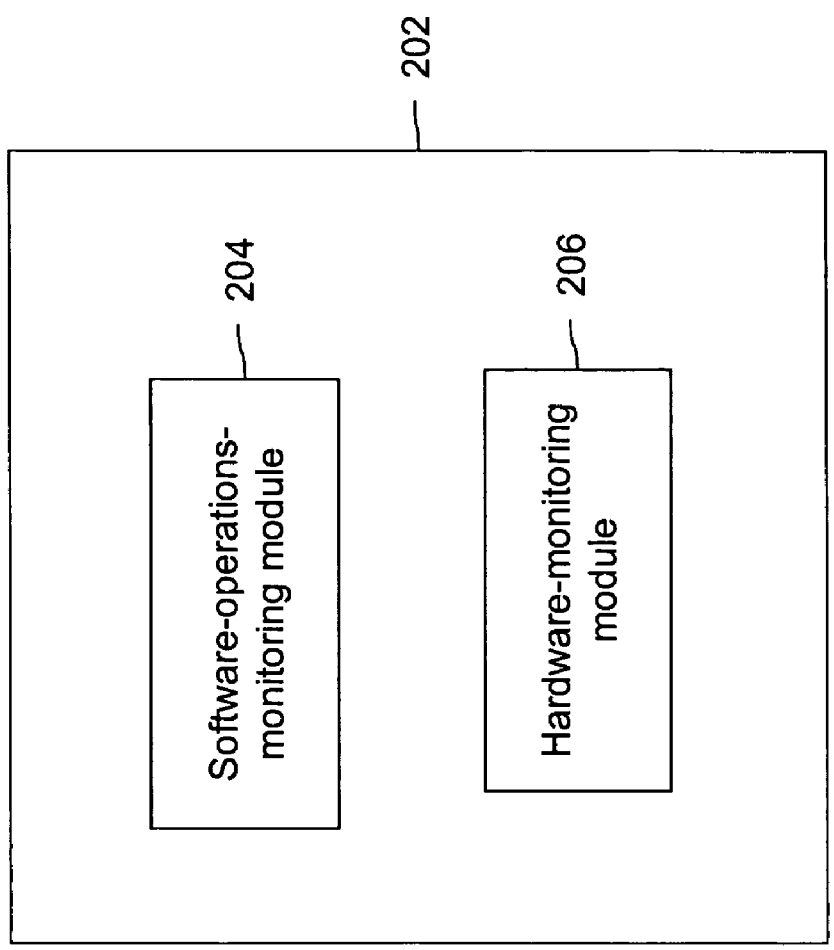
FIG. 2 is a block diagram of an apparatus for tracking at least one Layer-2 (L2) resource of a network device, in accordance with an embodiment of the invention.

FIG. 2 is a block diagram of an apparatus 202 for tracking at least one L2 resource of a network device, in accordance with an embodiment of the invention. Apparatus 202 includes a software-operations-monitoring module 204 and a hardware-monitoring module 206.

Software-operations-monitoring module 204 monitors software operations on the L2 resource. Software operations generally refer to L2 resources added, modified, removed by a user on a Command Line Interface (CLI) or L2 resources changed by software features and various L2 software modules. In various embodiments of the invention, software-operations-monitoring module 204 may be a software module implemented on an Internetworking Operating System (IOS) of the network device.

Hardware-monitoring module 206 monitors the state of the L2 resource in a corresponding hardware (e.g., the same hardware or network device having the L2 resources). In an embodiment of the invention, hardware-monitoring module 206 performs local polling, to monitor the state of the L2 resource in the corresponding hardware. Each of the L2 resources is polled at regular intervals, and the information collected is analyzed to monitor changes in the state of the L2 resource. In an embodiment of the invention, hardware monitoring module 206 interacts with the hardware in such a way that the hardware informs the hardware monitoring module 206 about any changes to any L2 resource at any time that any L2 resource gets changed or added or removed. In an embodiment of the invention, a Simple Network Management Protocol (SNMP) can be used to perform the polling. In various embodiments of the invention, monitoring of the L2 resources is assisted or conducted by suitable software residing in RP and/or SP which communicates with EARL. The information about changes to L2 resources logged on the RP would be read or polled by any suitable external device or protocol, such as an SNMP. In various embodiments of the invention, hardware-monitoring module 206 may be a software module implemented on the IOS of the network device.

In an embodiment of the invention, the L2 resource may be an age-byte-value, a Routed MAC (RM) entry, a distributed channel index, or a specific adjacency where a user may specify the destination index, the source MAC, and the destination MAC combination.

In various embodiments of the invention, the network device may be switch 106. Switch 106 maintains a MAC-address-table in which the MAC address of each hardware device connected to switch 106 is stored. If the MAC address entry of a hardware device (connected to computer network 102 through switch 106) is purged in a software operation, the MAC-address-table of switch 106 is updated. In this case, the software operation is monitored by software-operations-monitoring module 204, and the updating of the MAC-address-table is monitored by hardware-monitoring module 206.

Figure 3:
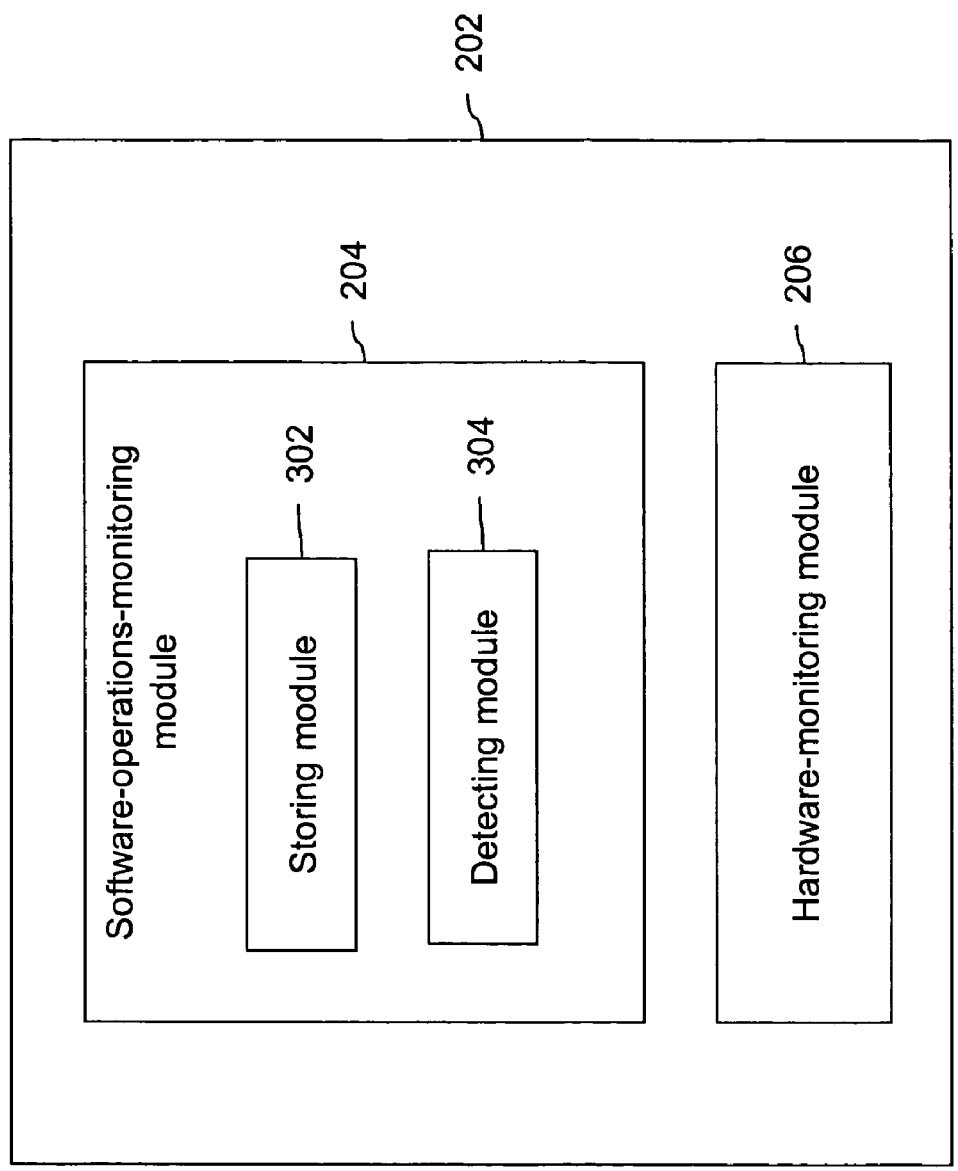
FIG. 3 is a block diagram of an apparatus for tracking at least one L2 resource of a switch, in accordance with another embodiment of the invention.

FIG. 3 is a block diagram of apparatus 202, for tracking at least one L2 resource of switch 106, in accordance with an embodiment of the invention. In this embodiment of the invention, software-operations-monitoring module 204 includes a storing module 302 and a detecting module 304.

Storing module 302 stores information pertaining to the user that has performed the software operation on the L2 resource. The information that is stored may be, for example, the user id, the time at which the software operation was performed, and so forth. Detecting module 304 detects an L2 feature that has directed a change in the state of the L2 resource. As previously indicated, monitoring of the L2 resources (e.g., monitoring the state of the L2 resource including any changes) is assisted or conducted by suitable software residing in RP and/or SP which communicates with EARL. In various embodiments of the invention, the L2 feature may be inserting, purging or modifying the L2 resource. In various embodiments of the invention, storing module 302 and detecting module 304 may be software modules that are implemented on the IOS of the network device.

Exemplary L2 features may be, but are not limited to, distributed etherchannels, unicast flood protection, per VLAN learning and aging; the dynamic addition of MAC address table entry through dynamic/distributed learning; static addition/purging of MAC address table entry through a router; static addition/purging of MAC address table entry through routing protocols (Open Shortest-path First Interior Gateway Protocol [OSPF]); L2 aging of dynamic entry; RM aging of RM entry; etherchannel aging of MAC entry on each etherchannel; purging of MAC entry during etherchannel aging; a change in the attributes of a MAC address table entry (such as RM, primary entry PI_E), due to distributed forwarding (as a result of MAC notification, flood to fabric [FF] or a new primary entry on a linecard of switch 106); a MAC move resulting in an index change of the MAC address table entry; purging of the MAC entry due to MAC limiting features; IOS CLI-triggered changes to MAC entry (removal of entry, changing attributes of an entry, adding entry); port security installing/purging static entry; multicast protocols installing/purging static entry through software; or static addition/purging of MAC address entry through Hot Swapable Routing Protocol (HSRP), Generic VLAN Registration Protocol (GVRP), Gateway Load Balancing Protocol (GLBP) protocols.

In various embodiments of the invention, switch 106 may be a distributed network switch such as the Catalyst 6K series switching system, manufactured by Cisco Technology Inc. In an exemplary embodiment of the invention, switch 106 may be Catalyst 6500 switching system manufactured by Cisco Technology Inc. In an embodiment of the invention, the Catalyst 6K series switching system is an Enhanced Address Recognition Logic (EARL) module-enabled system. The EARL module resides in supervisor (SP) and each Distributed Forwarding Card (DFC) line card in the Catalyst 6K series switching system. The EARL module may be EARL 5, EARL 6, EARL 7 or EARL 8. Exemplary L2 resources specific to the EARL module may be, but is not limited to, Bridge Domain (BD), Logical Interface (LIF), a specific portchannel index, and multiple portchannel indices.

In various embodiments of the invention, the L2 resource may be tracked on a specific module in switch 106. The L2 resources specific to the EARL module of switch 106 are tracked in an embodiment of the invention.

In an embodiment of the invention, an L2 resource that does not exist in the network device may be tracked after the L2 resource is created. A value is given to the L2 resource, and apparatus 202 starts tracking the L2 resource after it is created.

Figure 4:
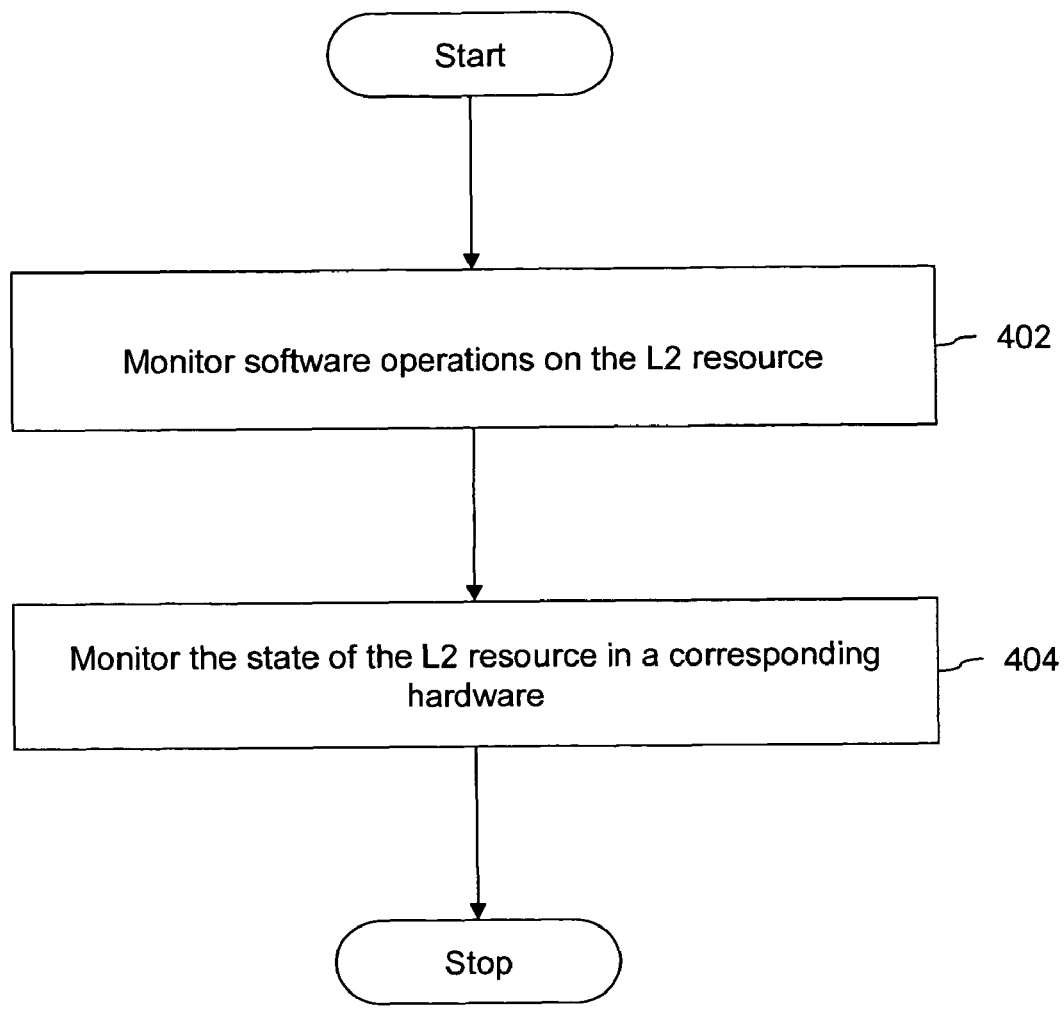
FIG. 4 is a flowchart illustrating a method for tracking at least one L2 resource of a network device, in accordance with an embodiment of the invention.

FIG. 4 is a flowchart illustrating a method for tracking at least one L2 resource of a network device, in accordance with an embodiment of the invention. Software operations on the L2 resource are monitored at step 402. The step of monitoring software operations can be performed by software-operations-monitoring means 204. In various embodiments of the invention, the information pertaining to the user that performs the software operations is then stored. Further, the L2 feature that directs the change in the state of the L2 resource is detected. The state of the L2 resource in a corresponding hardware is monitored at step 404. The step of monitoring L2 resource on the corresponding hardware can be performed by hardware-monitoring module 206.

In various embodiments of the invention, the L2 resource may be tracked on a specific module of the network device. Further, an L2 resource that does not exist in the network device may be tracked after the L2 resource is created.

In various embodiments of the invention, the L2 resource-tracking feature of apparatus 202 may be enabled, to track a specific MAC address in the EARL module by making a CLI entry. In an embodiment of the invention, the CLI entry may be, for example, debug earl 12-track <MAC address> [module <no>]

This CLI entry enables MAC address-tracking for each L2 entry with the given MAC address. 'Module' in the CLI entry generally refers to the SP or DFC line cards with the EARL. If the 'module' is not specified, MAC address tracing is enabled on each module. In this case, this CLI entry may be referred to as a global tracing configuration command. However, if the 'module; is specified, MAC address-tracing is enabled on the specified module. In this case, this CLI entry may be referred to as an explicit tracing configuration command. In another embodiment of the invention, the CLI entry may be, for example, debug earl 12-track VLAN <no.> [module <no>]

This CLI entry enables MAC address-tracing for each L2 entry with the given VLAN identifier. In yet another embodiment of the invention, the CLI entry may be, for example, debug earl 12-track <MAC address> VLAN <no.> [module <no>]

This CLI entry enables MAC address tracing for each L2 entry with the given MAC address and VLAN pair.

In an exemplary embodiment of the invention, when the L2 resource tracking feature of apparatus 202 is enabled on a specific L2 resource, for example, a MAC address entry, each change to that specific entry is logged on the SP/DFC console in the following manner:

05:38:41: SP: L2TRACK: Entry [<MAC address>, <VLAN>, <index>, <RM>, <PI_E>, . . . ] changed index to <new-index>

05:38:41: SP: L2TRACK: Entry [<MAC address>, <VLAN>, <index>, <RM>, <PI_E>, . . . ] added 2d06h: DFC4: L2TRACK: Entry [<MAC address>, <VLAN>, <valid>, <RM>, <PI_E>, . . . ] changed age to <new-age>

2d06h: DFC4: L2TRACK: Entry [<MAC address>, <VLAN>, <valid>, <RM>, <PI_E>, . . . ] purged In an embodiment of the invention, if the L2 resource-tracking feature of apparatus 202 is enabled on a specific module (SP or DFC), these logs are printed only on the respective module. If the L2 resource-tracking feature of apparatus 202 is enabled on each module, the logs are printed on each module, including the active SP, and each DFC.

In various embodiments of the invention, the L2 resource-tracking feature of apparatus 202 may be disabled for tracking a specific MAC address in the EARL module, by making a CLI entry. In an embodiment of the invention, the CLI entry may be, for example, no debug earl 12-track <MAC address> [module <no>]

This CLI entry disables MAC address-tracking for each L2 entry with the given MAC address. If the 'module' is not specified, MAC address-tracing is disabled on each module. In this case, this CLI entry may be referred to as a global tracing configuration command. However, if the 'module; is specified, MAC address-tracing is disabled on the specified module. In this case, this CLI entry may be referred to as an explicit tracing configuration command. In another embodiment of the invention, the CLI entry may be, for example, no debug earl 12-track VLAN <no.> [module <no>]

This CLI entry disables MAC address-tracing for each L2 entry with the given VLAN identifier. In yet another embodiment of the invention, the CLI entry may be, for example, no debug earl 12-track <MAC address> VLAN <no.> [module <no>]

This CLI entry disables MAC address-tracing for each L2 entry with the given MAC address and VLAN pair.

Embodiments of the invention have the advantage that the apparatus and method provides flexibility to configure tracing of one or more MAC addresses, VLAN identifiers, MAC address/VLAN identifier pairs, or other L2 resources in an L2 table of a network device. This allows multiple MAC addresses to be tracked at the same time. Further, the MAC address entry can be tracked across each DFC or on a specific module (DFC/SP).

Further, embodiments of the invention have the advantage that the apparatus and method provides an insight into how an L2 resource is being used in a switch, such as the Catalyst 6K series switching system L2 switching/forwarding path. Further, by determining how resources are being used within the switch, integration of contenting/resource-sharing features or functionalities may be performed much faster and more efficiently.

Embodiments of the invention also have the advantage that an analysis of the use and evolution of an L2 resource may be performed in a much easier manner. Further, troubleshooting switches deployed in core/metro network is much easier with this invention, and development/debugging/troubleshooting time can be expedited to a great extent with the use of the various embodiments of the invention.

Although the invention has been discussed with respect to specific embodiments thereof, these embodiments are merely illustrative, and not restrictive, of the invention. For example, specific protocols have been used to describe embodiments, other embodiments can use other transmission protocols or standards. Use of the terms 'peer', 'client', and 'server' can include any type of device, operation, or other process. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the invention.

A 'computer readable medium' for purposes of embodiments of the invention may be any medium that can contain and store the computer program for use by or in connection with the instruction execution system apparatus, system or device. The computer readable medium can be, by way of example only but not by limitation, a semiconductor system, apparatus, system, device, or computer memory. The computer readable medium may have suitable instructions for synchronously presenting multiple video program ID streams, such as on a display screen, or for providing for input or presenting in accordance with various embodiments of the invention.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method comprising:
   accepting a communication from a user input device designating a layer-2 (L2) resource, wherein the L2 resource is associated with a plurality of modules, and wherein each of the plurality of modules is configured to perform a different monitoring operation;
   accepting a communication from the user input device to indicate one or more monitoring operations to be performed, wherein the one or more monitoring operations are performed on a per module basis, and wherein the communication indicates whether an L2 tracking feature in each of the modules is enabled or disabled;
   monitoring software operations on the L2 resource of a network device according to the one or more monitoring operations, wherein monitoring the software operations comprises software operations configured to detect an L2 feature that directs a change in a state of the L2 resource;
   monitoring a plurality of state changes of the L2 resource in the network device according to the one or more monitoring operations; and
   displaying at least a portion of the plurality of the monitored state changes to show an evolution of state changes to the L2 resource.

2. The method of claim 1 wherein the L2 resource includes a media access control (MAC) address.

3. The method of claim 1 wherein the L2 resource includes a virtual local area network (VLAN) identifier.

4. The method of claim 1 wherein the L2 resource includes a media access control (MAC) address and virtual local area network (VLAN) identifier pair.

5. The method of claim 1 wherein monitoring the software operations comprises storing information of a user.

6. The method of claim 1 wherein the L2 feature includes at least one of inserting, purging or modifying of the L2 resource.

7. An apparatus comprising:
   an input module including a processor, the input module configured to accept a communication from a user input device designating a layer-2 (L2) resource, wherein the L2 resource is associated with a plurality of modules, wherein each of the plurality of modules is configured to perform a monitoring operation that is different from a monitoring operation of another module in the plurality of modules;
   the input module further configured to accept a communication from the user input device to indicate one or more monitoring operations to be performed, wherein the one or more monitoring operations are performed on a per module basis, and wherein the communication comprises information to indicate whether an L2 tracking feature in each of the modules is enabled or disabled;
   a software-operations-monitoring module including a processor, the software-operations-monitoring module is configured to monitor software operations on the L2 resource of a network device according to the one or more monitoring operations, wherein the software-operations-monitoring module is configured to monitor the software operations including software operations for detecting an L2 feature that directs a change in a state of the L2 resource;
   a hardware-operations-monitoring module including a processor, the hardware-operations-monitoring module configured to monitor a plurality of state changes of the L2 resource in the network device according to the one or more monitoring operations; and
   a display module configured to display at least a portion of the plurality of the monitored state changes to show an evolution of state changes to the L2 resource.

8. The apparatus of claim 7 wherein the L2 resource includes a media access control (MAC) address.

9. The apparatus of claim 7 wherein the L2 resource includes a virtual local area network (VLAN) identifier.

10. The apparatus of claim 7 wherein the L2 resource includes a media access control (MAC) address and virtual local area network (VLAN) identifier pair.

11. The apparatus of claim 7, further comprising a command line interface (CLI) for making an L2 entry corresponding to the software operation.

12. The apparatus of claim 7 wherein the software operations are configured to store information pertaining to a user.

13. An apparatus comprising:
   a software-operations-monitoring module including one or more processors, the software-operations-monitoring module configured to monitor software operations on a layer-2 (L2) resource of a switch, wherein the L2 resource is associated with a plurality of modules, and wherein each of the plurality of modules is configured to perform a monitoring operation that is different from a monitoring operation of another module in the plurality of modules, the software-operations-monitoring module comprising:
      a storing module configured to store information pertaining to a user; and
      a detecting module configured to detect an L2 feature that directs a change in a state of the L2 resource; and
   a hardware-monitoring module including one or more processors, the hardware-monitoring module configured to monitor the state of the L2 resource in the switch in response to a communication from a user input device to designate the L2 resource and to indicate one or more monitoring operations to be performed, wherein the one or more monitoring operations are performed on a per module basis, and wherein the communication comprises information to indicate whether an L2 tracking feature in each of the modules is enabled or disabled, and wherein the hardware-monitoring module is configured to monitor and display a plurality of state changes of the L2 resource to indicate an evolution of state changes to the L2 resource.

14. The apparatus of claim 13 wherein the L2 resource is at least one of a media access control (MAC) address, a virtual local area network (VLAN) identifier and a MAC address and VLAN identifier pair.

15. The apparatus of claim 13 wherein the software operation includes an L2 entry made by the user on a command line interface (CLI).

16. An apparatus comprising:
a processing system including a processor coupled to a display and user input device; and
a machine-readable medium including instructions executable by the processor comprising:
  one or more instructions for accepting a communication from a user input device designating a layer-2 (L2) resource, wherein the L2 resource is associated with a plurality of modules, and wherein each of the plurality of modules is configured to perform a monitoring operation that is different from a monitoring operation of another module in the plurality of modules;
  one or more instructions for accepting a communication from the user input device to indicate one or more monitoring operations to be performed, wherein the one or more monitoring operations are performed on a per module basis, and wherein the communication comprises information to indicate whether an L2 tracking feature in each of the modules is enabled or disabled;
  one or more instructions for monitoring software operations on the L2 resource of a network device according to the one or more monitoring operations, wherein monitoring the software operations comprises detecting an L2 feature that directs a change in a state of the L2 resource;
  one or more instructions for monitoring a plurality of state changes of the L2 resource in the network device according to the one or more monitoring operations; and
  one or more instructions for displaying at least a portion of the plurality of the monitored state changes to show an evolution of state changes to the L2 resource.

17. A non-transitory computer-readable medium including instructions executable by a processor, the computer-readable medium comprising:
  one or more instructions for accepting a communication from a user input device designating a layer-2 (L2) resource, wherein the L2 resource is associated with a plurality of modules, and wherein each of the plurality of modules is configured to perform a monitoring operation that is different from a monitoring operation of another module in the plurality of modules;
  one or more instructions for accepting a communication from the user input device to indicate one or more monitoring operations to be performed, wherein the one or more monitoring operations are performed on a per module basis, and wherein the communication comprises information to indicate whether an L2 tracking feature in each of the modules is enabled or disabled;
  one or more instructions for monitoring software operations on the L2 resource according to the one or more monitoring operations, wherein monitoring the software operations comprises detecting an L2 feature that directs a change in a state of the L2 resource;
  one or more instructions for monitoring the state of the L2 resource in a network device according to the one or more monitoring operations;
  one or more instructions for monitoring a plurality of state changes of the L2 resource in the network device according to the one or more monitoring operations; and
  one or more instructions for displaying at least a portion of the plurality of the monitored state changes to show an evolution of state changes to the L2 resource.

18. An apparatus comprising:
a first module including one or more processors, the first module configured to monitor software operations on a layer-2 (L2) resource of a switch, wherein the L2 resource is included in one or more line cards of the switch, wherein the first module is configured to monitor the L2 resource by monitoring operations of logic residing on the one or more line cards, the first module comprising:
  a storing module configured to store information pertaining to a user initiating the software operations on the L2 resource of the switch; and
  a detecting module configured to detect an L2 feature that directs a change in a state of the L2 resource; and
a second module including one or more processors, the second module configured to monitor the state of the L2 resource on the one or more line cards, wherein the second module is configured to monitor each line card by collecting information from the monitoring of the operations of the logic residing on each line card, and wherein the second module is configured to analyze the collected information to monitor changes in the state of the L2 resource, and wherein the collected information is associated with the changes in the state of the L2 resource.

* * * * *